United States Patent
Yasuda (10) Patent No.: US 11,746,895 B2
(45) Date of Patent: Sep. 5, 2023

(54) SHIFT RANGE DEVICE

(71) Applicant: DENSO CORPORATION, Kariya (JP)

(72) Inventor: Shoichi Yasuda, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/725,805

(22) Filed: Apr. 21, 2022

(65) Prior Publication Data

US 2022/0243809 A1 Aug. 4, 2022

Related U.S. Application Data

(63) Continuation of application No. PCT/JP2020/035261, filed on Sep. 17, 2020.

(30) Foreign Application Priority Data

Oct. 25, 2019 (JP) .................................. 2019-193912

(51) Int. Cl.
*F16H 61/12* (2010.01)
*F16H 61/32* (2006.01)

(52) U.S. Cl.
CPC .............. *F16H 61/12* (2013.01); *F16H 61/32* (2013.01); *F16H 2061/1212* (2013.01); *F16H 2061/1288* (2013.01); *F16H 2061/326* (2013.01)

(58) Field of Classification Search
CPC .. F16H 61/12; F16H 61/32; F16H 2061/1212; F16H 2061/1288; F16H 2061/326
See application file for complete search history.

(56) References Cited

U.S. PATENT DOCUMENTS

| | | | |
|---|---|---|---|
| 7,005,814 B2 * | 2/2006 | Nakai | ........................ H02P 6/24 318/431 |
| 2004/0066166 A1 * | 4/2004 | Nakai | ................... F16H 59/105 318/701 |
| 2009/0108791 A1 | 4/2009 | Isobe et al. | |
| 2013/0141031 A1 | 6/2013 | Yamada | |
| 2014/0336864 A1 | 11/2014 | Yoshida et al. | |
| 2017/0023133 A1 * | 1/2017 | Tarui | ........................ F16H 61/12 |
| 2019/0264805 A1 | 8/2019 | Kamio | |
| 2020/0224762 A1 | 7/2020 | Yamamoto et al. | |

* cited by examiner

*Primary Examiner* — Edwin A Young
(74) *Attorney, Agent, or Firm* — Nixon & Vanderhye P.C.

(57) ABSTRACT

A shift range device switches a shift position. The shift range device includes a motor and an energizing unit. The motor functions as a power source for switching the shift position. The energizing unit energizes the motor. The shift range device monitors an abnormal state in which a magnetic field that causes a rotation of a rotor of the motor not to start or a holding magnetic field that stops the rotation generated in the rotor is incapable to be acquired.

10 Claims, 9 Drawing Sheets

SHIFT RANGE DEVICE

CROSS REFERENCE TO RELATED APPLICATIONS

The present application is a continuation application of International Patent Application No. PCT/JP2020/035261 filed on Sep. 17, 2020, which designated the U.S. and claims the benefit of priority from Japanese Patent Application No. 2019-193912 filed on Oct. 25, 2019. The entire disclosures of all of the above applications are incorporated herein by reference.

TECHNICAL FIELD

The present disclosure relates to a shift range device.

BACKGROUND

A vehicle is provided with a shift range control device for switching shift positions such as drive, back, neutral, and parking. In such a shift range control device, when a shift range switching request is received from the driver, a motor is driven to switch the shift range.

SUMMARY

The present disclosure provides a shift range device that switches a shift position. The shift range device includes a motor and an energizing unit. The motor functions as a power source for switching the shift position. The energizing unit energizes the motor. The shift range device monitors an abnormal state in which a magnetic field that causes a rotation of a rotor of the motor not to start or a holding magnetic field that stops the rotation generated in the rotor is incapable to be acquired.

BRIEF DESCRIPTION OF DRAWINGS

The features and advantages of the present disclosure will become more apparent from the following detailed description made with reference to the accompanying drawings. In the drawings.

DETAILED DESCRIPTION

For example, in a first exemplary shift range control device, in order to prevent erroneous switching due to a runaway of a microcomputer, a monitoring circuit, which is provided separately from the shift range control device, monitors whether or not the shift range control device is operating normally, and stops the drive of the shift range control device when determining that the shift range control device is not operating normally. A second exemplary shift range control device drives a motor, and perform excitation phase learning to learn the positional relationship between an encoder and a rotor.

In the first exemplary shift range control device described, when a shift switching request is made from the driver, the monitoring is canceled and the motor is driven. However, when it is desired to drive the motor without a shift switching request from the driver, there is a difficulty that an erroneous detection may be made by counting the number of changes in the energization register. That is, there is a difficulty that an erroneous detection occurs when the motor is driven at an extremely low speed without a shift switching request from the driver such as excitation phase learning.

An exemplary embodiment of the present disclosure provides a shift range device configured to switch a shift position. The shift range device includes a motor functioning as a power source for switching the shift position; an energizing unit configured to energize the motor; and a monitoring unit configured to monitor an abnormal state in which a magnetic field that causes a rotation of a rotor of the motor not to start or a holding magnetic field that stops the rotation generated in the rotor is incapable to be acquired. When the monitoring unit determines that the abnormal state occurs, the monitoring unit causes the energizing unit to stop energizing the motor.

In the exemplary embodiment of the present disclosure, the configuration can determine whether or not the operation of the motor is abnormal when the motor is driven at an extremely low speed such as excitation phase learning.

First Embodiment

Figure 1:
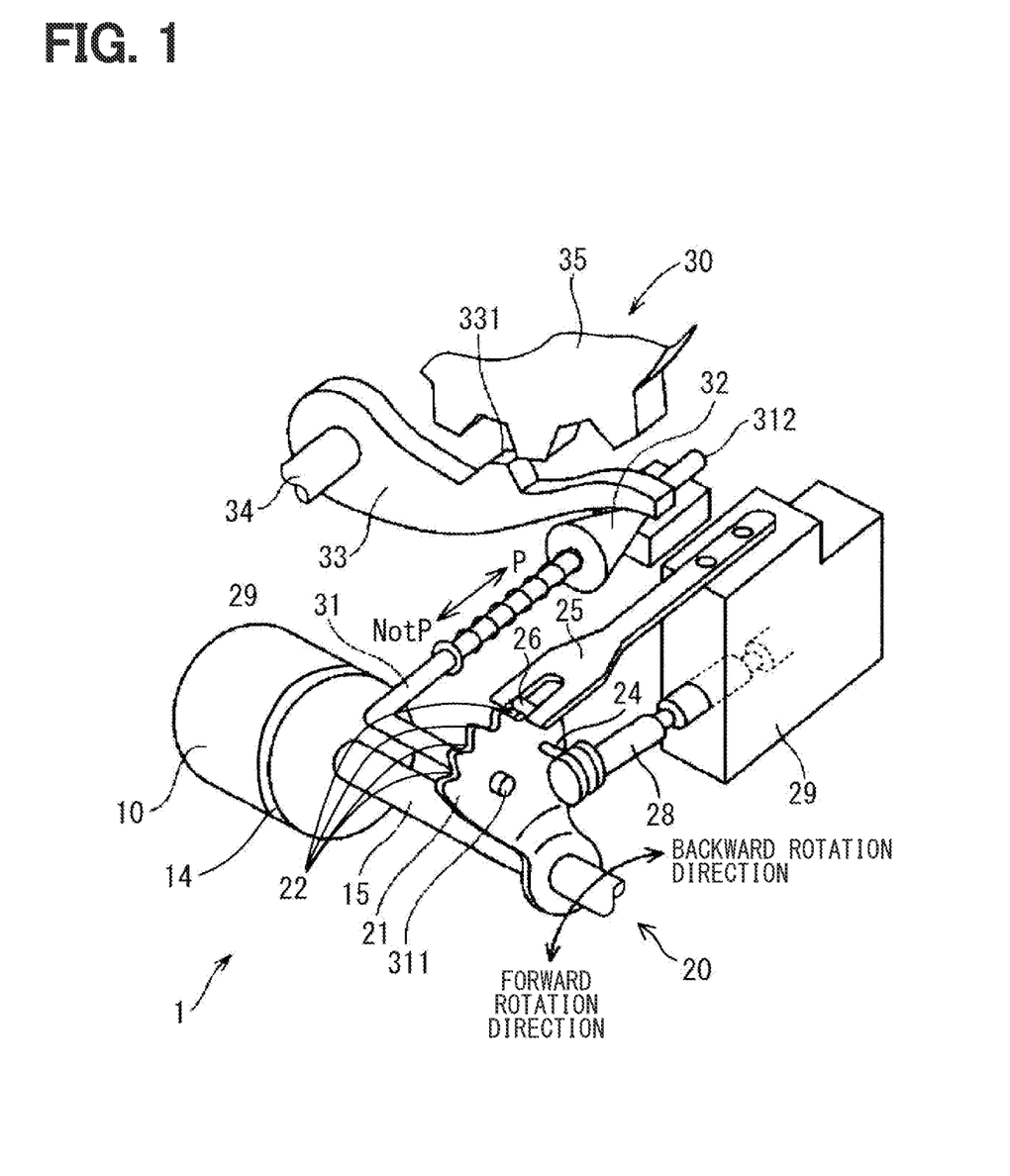
FIG. 1 is a perspective view showing a shift range device.
Figure 2:
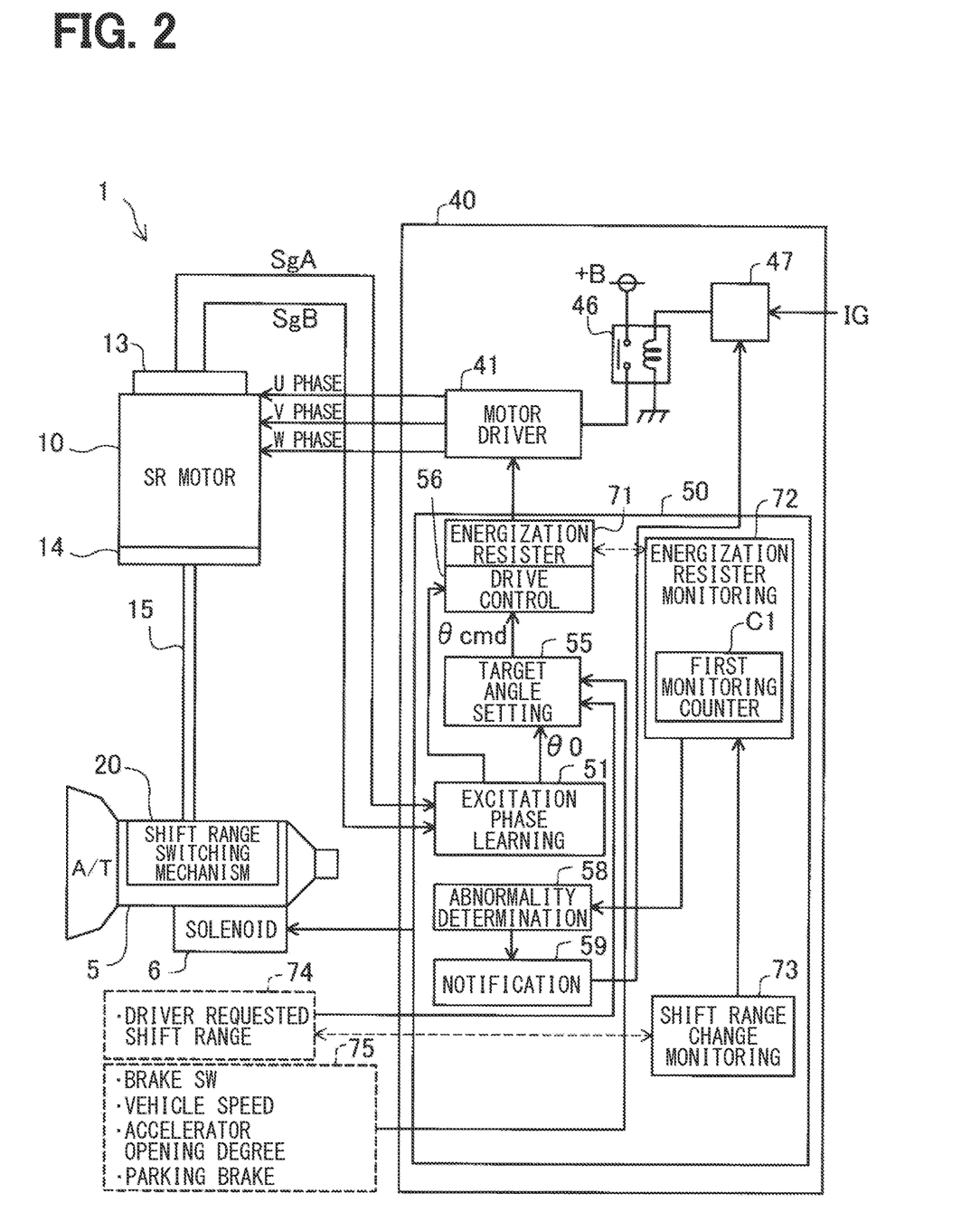
FIG. 2 is a schematic configuration diagram showing an ECU which is a control unit of the shift range device.

As shown in FIGS. 1 and 2, a shift range device 1 includes a motor 10, a speed reducer 14, an output shaft 15, a shift range switching mechanism 20, a parking lock mechanism 30, a shift range control device 40, and the like. The motor 10 drives by being supplied with electric power from a battery (not shown) mounted in a vehicle, and functions as a power source for the shift range switching mechanism 20. The motor 10 of this embodiment is, for example, an SR motor.

The speed reducer 14 is provided between a motor shaft of the motor 10 and the output shaft 15 to decelerate the rotation of the motor 10 and output the decelerated rotation to the output shaft 15. As a result, the rotation of the motor 10 is transmitted to the shift range switching mechanism 20.

As shown in FIG. 1, the shift range switching mechanism 20 includes a detent plate 21, a detent spring 25, and the like. The detent plate 21 is a substantially fan-shaped member that is fixed to the output shaft 15 and rotates integrally with the output shaft 15 by being driven by the motor 10. The detent plate 21 includes four valleys 22 in a substantially fan-shaped arc portion. The rotational driving force decelerated by the speed reducer 14 is transmitted to the manual valve 28 and the parking lock mechanism 30, and these are operated as follows.

The detent plate 21 is provided with a pin 24 protruding in parallel with the output shaft 15. The pin 24 is connected with a manual valve 28. When the detent plate 21 is driven by the motor 10, the pin 24 rotates around the output shaft together with the detent plate 21, and the manual valve 28 reciprocates in the axial direction. In other words, the shift range switching mechanism 20 converts a rotational motion of the motor 10 into a linear motion and transmits the linear motion to the manual valve 28. The manual valve 28 is provided in a valve body 29. When the manual valve 28 reciprocates in the axial direction, a hydraulic supply path to a hydraulic clutch (not shown) is switched, and an engagement state of the hydraulic clutch is switched. In this way, the shift range is switched.

The detent spring 25 is a resiliently deformable plate-like member provided with a detent roller 26 at a tip end. The detent roller 26 is an engaging member. The detent roller 26 fits into any of the four valleys 22 formed in the detent plate 21. In the present embodiment, since the number of valleys 22 formed in the detent plate 21 is four, the number of engagement positions in which the detent roller 26 engages is four.

The detent spring 25 urges the detent roller 26 toward the center of rotation of the detent plate 21. When a rotational force equal to or greater than a predetermined force is applied to the detent plate 21, the detent spring 25 is elastically deformed, and the detent roller 26 sequentially moves through the four valleys 22. When the detent roller 26 is fitted into any one of the four valleys 22, the swinging motion of the detent plate 21 around the output shaft is regulated, the axial position of the manual valve 28 and the state of the parking lock mechanism 30 are determined, and the shift range of an automatic transmission 5 is fixed.

The parking lock mechanism 30 includes a parking rod 31, a conical member 32, a parking lock pawl 33, a shaft part 34 and a parking gear 35. The parking rod 31 has a substantially L-shape, and one end 311 is fixed to the detent plate 21. The other end 312 of the parking rod 31 is provided with the conical member 32. The conical member 32 is formed to reduce in diameter toward the other end 312. When the detent plate 21 swings in the backward rotation direction of FIG. 1, the conical member 32 moves in the direction of the arrow P together with the parking rod 31.

The parking lock pawl 33 comes into contact with a conical surface of the conical member 32 and is provided so as to be swingable around the shaft part 34. On the parking gear 35 side of the parking lock pawl 33, a protrusion 331 that can mesh with the parking gear 35 is provided. When the detent plate 21 rotates in the backward rotation direction and the conical member 32 moves in the arrow P direction, the parking lock pawl 33 is pushed up toward the parking gear 35, and the protrusion 331 and the parking gear 35 mesh with each other. On the other hand, when the detent plate 21 rotates in the forward rotation direction and the conical member 32 moves in the arrow NotP direction, the parking lock pawl 33 moves so as to be separated from the parking gear 35, and the mesh between the protrusion 331 and the parking gear 35 mesh is released.

The parking gear 35 is provided on an axle (not shown) and is enabled to engage with the protrusion 331 of the parking lock pawl 33. The parking gear 35 meshing with the protrusion 331 restricts the rotation of the axle. When the shift range is one of the ranges (Not P range) other than the P range, the parking gear 35 is not locked by the parking lock pawl 33. Therefore, the rotation of the axle is not restricted by the parking lock mechanism 30. When the shift range is the P range, the parking gear 35 is locked by the parking lock pawl 33 and the rotation of the axle is restricted.

As shown in FIG. 2, the shift range control device 40 includes a motor driver 41, an ECU 50, and the like. The motor driver 41 functions as an energization unit that energizes each phase (U phase, V phase, W phase) of the motor 10. A motor relay 46 is provided between the motor driver 41 and the power supply line+B from the battery. The motor relay 46 is turned on by the relay control unit 47 when the start switch IG of the vehicle, which is an ignition switch or the like, is turned on, and enables power supply to the motor 10 side. Further, the motor relay 46 is turned off by the relay control unit 47 when the start switch IG is turned off, and the power supply to the motor 10 side is cut off.

The ECU 50 is mainly composed of a microcomputer and the like, and internally includes a CPU, a ROM, a RAM, an I/O, a bus line for connecting these components, and the like, which are not shown. Each processing in the ECU 50 may be software processing by executing a program stored in advance in a tangible memory device (that is, a readable non-transitory tangible recording medium) such as the ROM by the CPU, or may be hardware processing by a dedicated electronic circuit.

The ECU 50 controls the switching of the shift range by controlling the driving of the motor 10 based on a driver requested shift range, a signal from the brake switch, a vehicle speed, and the like. The ECU 50 controls the drive of a shift hydraulic control solenoid 6 provided in the automatic transmission 5 based on the vehicle speed, an accelerator opening degree, the driver-requested shift range, and the like. By controlling the shift hydraulic control solenoid 6, the shift stage is controlled. The number of the shift hydraulic control solenoids 6 is determined according to the number of shift stages or the like. In the present embodiment, one ECU 50 controls the drive of the motor 10 and the solenoid 6, but a motor ECU for controlling the motor 10 and an AT-ECU for controlling the solenoid may be separated from each other. Hereinafter, a drive control of the motor 10 will be mainly described.

The ECU 50 includes an excitation phase learning unit 51, a target angle setting unit 55, a drive control unit 56, an abnormality determination unit 58, a notification unit 59, an energization register 71, an energization register monitoring unit 72, a shift range change monitoring unit 73, and the like.

As shown in FIG. 2, the motor 10 is provided with an encoder 13 as a rotation angle sensor. The encoder 13 detects a rotary position of a rotor (not shown) of the motor 10. The encoder 13 is, for example, a magnetic rotary encoder, and includes a magnet that rotates integrally with the rotor, a Hall IC for magnetic detection, and the like. The encoder 13 outputs an A-phase pulse signal SgA and a B-phase pulse signal SgB at predetermined angles in synchronization with the rotation of the rotor.

The excitation phase learning unit 51 executes excitation learning to learn the relationship between the count values of the pulse signals SgA and SgB from the encoder 13 and the energized phase. When the excitation phase learning unit 51 performs excitation learning, for example, the excitation phase learning unit 51 instructs UV phase energization, U phase energization, WU phase energization, W phase energization, VW phase energization, V phase energization, UV phase energization with respect to the drive control unit 56 in this order. The excitation phase learning unit 51 simultaneously acquires pulse signals SgA and SgB output from the encoder 13, learns the relationship between the energized phase and the pulse signals SgA and SgB of the encoder 13, and generates an initial value θ0. The initial value θ0 of the rotor angle is output to the target angle setting unit 55.

The target angle setting unit 55 sets a target shift range based on signals from a sensor group provided in the vehicle, for example, a driver required shift range 74 based on a shift switch or the like, a vehicle speed sensor, a brake switch sensor, a parking brake sensor 75, or the like. Further, the target angle setting unit 55 sets a target count value θcmd corresponding to the motor angle target value, which is the target angle for rotating the motor 10, according to the initial value θ0 and the target shift range. The target count value θcmd is a target value of how much the motor 10 is rotated from the initial value θ0.

The drive control unit 56 controls the drive of the motor 10 by feedback control or the like so that the motor 10 stops at a rotation position where the value is the target count value θcmd. For example, when the drive control unit 56 sequentially sets the drive pattern of the motor driver 41, that is, the phase to be energized in the energization register 71 based on the target count value θcmd, the motor driver 41 drives the motor 10 based on the drive pattern.

The energization register 71 is a register that stores a signal indicating a phase set by the drive control unit 56. The energization register monitoring unit 72 has a first monitoring counter C1. The energization register monitoring unit 72 monitors the signal indicating the phase stored in the energization register 71, and counts up the count value of the first monitoring counter C1 when there is a change in the energized phase. When the energization register monitoring unit 72 determines, from the count value of the first monitoring counter C1, that an abnormality has occurred in excitation learning, the energization register monitoring unit 72 notifies the abnormality determination unit 58. The details of this abnormality determination will be described later.

The abnormality determination unit 58 determines whether an abnormality has occurred in the drive of the motor 10 from the change in the energization register 71 monitored by the energization register monitoring unit 72. When the notification unit 59 receives a notification of an abnormality in the drive of the motor 10 from the abnormality determination unit 58, the notification unit 59 notifies the driver. Notification is performed by sound, display on the instrument panel, or the like. The notification unit 59 may instruct the relay control unit 47 to cut off the supply of electric power to the motor 10 side.

The shift range change monitoring unit 73 monitors the presence or absence of a shift operation by the driver by monitoring the driver request shift range 74. When there is a shift operation by the driver, the shift range change monitoring unit 73 instructs the energization register monitoring unit 72 that the energization register 71 does not need to be monitored for a certain period of time, for example, 5 seconds.

In the present embodiment, the ECU 50 cancels the monitoring of the energization register 71 when a shift switching request is generated, permits energization, and enables the motor 10 to be driven. In addition, the ECU 50 performs excitation learning before the driver starts the vehicle and switches the shift position, and cancels the monitoring of the energization register 71 as described below.

Figure 3:
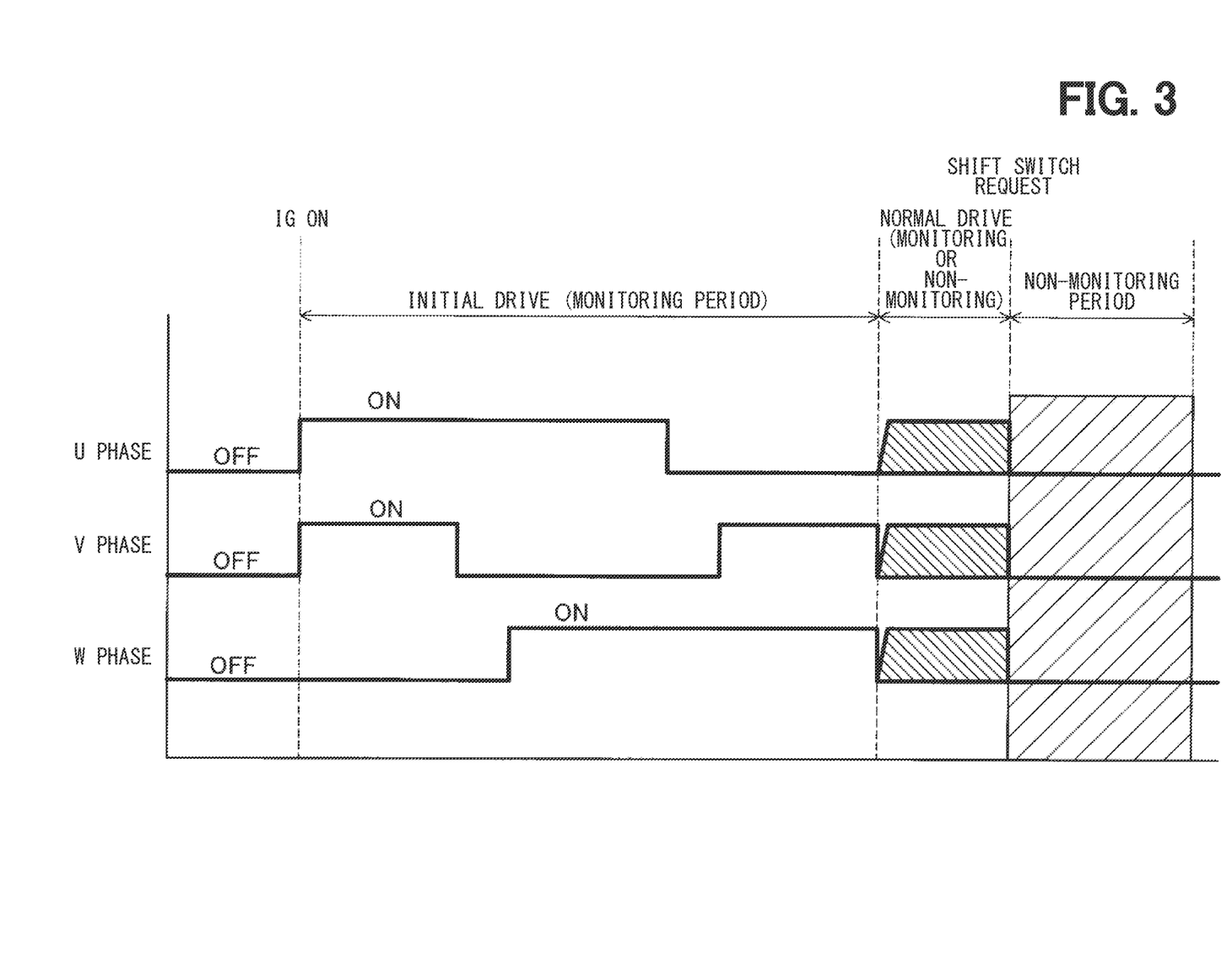
FIG. 3 is an explanatory diagram showing a monitoring period.

In the present embodiment, as shown in FIG. 3, the period that is a relatively long period from reception of the driver's shift switching request after the ECU 50 starts is defined as a non-monitoring period in which a monitoring unnecessary condition for not monitoring the energization register 71 for abnormality determination is established. Another period that is a period between a time point when the start switch IG is turned on and a time point when the normal drive starts is defined as a monitoring period for monitoring the energization register 71 except for the excitation learning period. The normal drive is a period between the initial drive time for a certain period after the start switch IG is turned on and the non-monitoring period after the driver's shift switching request is made. During the normal drive, it can be either the monitoring period or the non-monitoring period based on the operating state of the shift position, foot brake, or the like. The shift range change monitoring unit 73, which is a determination unit, determines whether or not the monitoring unnecessary condition is satisfied. When the shift range change monitoring unit 73 determines that the monitoring unnecessary condition is not satisfied, the energization register monitoring unit 72 determines whether the energization of the motor 10 is in a predetermined state as an abnormal state by monitoring the energization register 71. On the other hand, when the shift range change monitoring unit 73 determines that the monitoring unnecessary condition is satisfied, the energization register monitoring unit 72 does not monitor the energization register 71.

The shift range change monitoring unit 73 determines that the monitoring unnecessary condition is satisfied when at least one of (a) a shift operation that can detect that the driver can be notified, (b) a brake-on state, and (c) a parking brake-on state capable of maintaining a vehicle holding force regardless of a driver intervention is satisfied.

Figure 4:
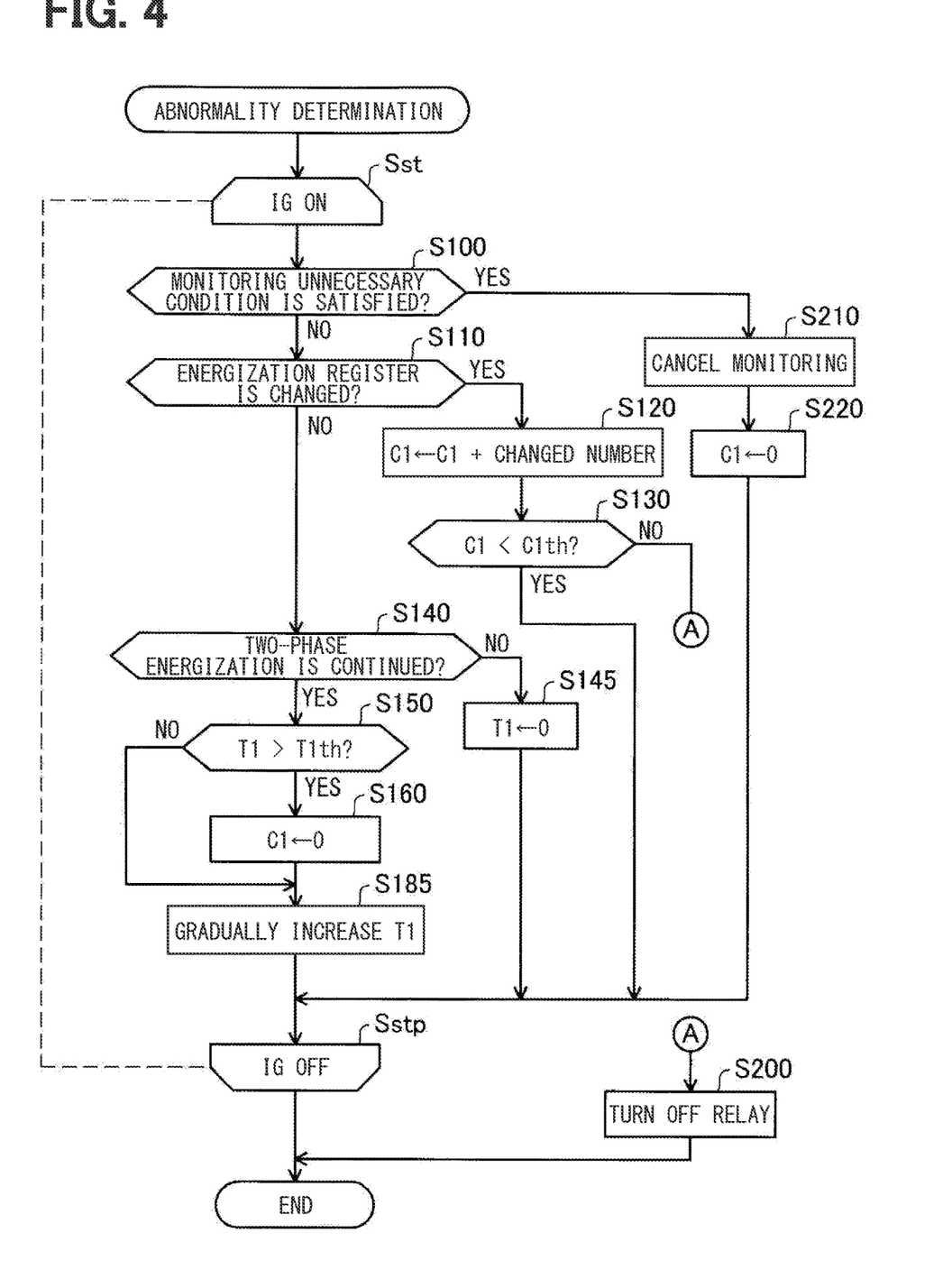
FIG. 4 is a flowchart showing an abnormal determination for an operation of a motor according to a first embodiment.

The abnormality determination of the shift range apparatus 1 performed by the ECU 50 will be described with reference to FIG. 4. The ECU 50 executes the operation from step Sst to step Sstp as one loop at predetermined time intervals from on to off of the start switch IG. The ECU 50 resets the first monitoring counter C1 and the two-phase energization timer T1 when first entering this loop.

In step S100, the shift range change monitoring unit 73 of the ECU 50 determines whether or not the monitoring unnecessary condition is satisfied. When the monitoring unnecessary condition is not satisfied, the ECU 50 shifts the process to step S110. On the other hand, when the monitoring unnecessary condition is not satisfied, the ECU 50 shifts the process to step S210. The shift range change monitoring unit 73 of the ECU 50 determines that the monitoring unnecessary condition is satisfied when any of the above (a) to (c) is satisfied.

In step S110, the ECU 50 causes the excitation phase learning unit 51 to perform the excitation learning. At this time, the energization register monitoring unit 72 of the ECU 50 determines whether or not there is a change in the energized phase in the energization register 71. The phase change means that the energized state has changed to the non-energized state, or the non-energized state has changed to the energized state. When there is a phase change, the process proceeds to step S120, and when there is no phase change, the process proceeds to step S140.

In step S120, the ECU 50 adds the number of changed phases to the value of the first monitoring counter C1 and the process proceeds to step S130. The first monitoring counter C1 is a counter that counts the number of phase changes in the motor 10.

In step S130, the ECU 50 determines whether or not the value of the first monitoring counter C1 is less than a first threshold value C1th. When the value of the first monitoring counter C1 is less than the first threshold value C1th, the ECU 50 ends the current loop and shifts to the next loop. On the other hand, when the value of the first monitoring counter C1 is equal to or higher than the first threshold value C1th, the ECU 50 shifts the process to step S200 and turns off the motor relay 46. As a result, the power supply to the motor 10 is stopped. When the process proceeds to step S200, the ECU 50 exits to the end and temporarily terminates the process.

When there is no change in the phase of the energization register (step S110: No), the ECU 50 causes the energization register monitoring unit 72 to determine in step S140 whether or not the two-phase energization is continued. The two-phase energization is a state in which energization is performed in two of the U phase, the V phase, and the W phase. When the two-phase energization continues, the ECU 50 proceeds to step S150, and when not, the process proceeds to step S145.

In step S145, the two-phase energization timer T1 is reset. The two-phase energization timer T1 is a timer that counts the duration of two-phase energization, and gradually increases while the two-phase energization is performed, as will be described later. In step S150, the ECU 50 determines whether or not the value of the two-phase energization timer T1 exceeds a second threshold value T1th. When the value of the two-phase energization timer T1 exceeds the second threshold value T1th, the ECU 50 shifts the process to step S160, and if not, the process shifts to step S185.

In step S160, the ECU 50 resets the value of the first monitoring counter C1 and proceeds to step S185. In step S185, the ECU 50 gradually increases the two-phase energization timer T1. After that, the ECU 50 shifts to the next loop. In the present embodiment, for convenience, the gradual increase of the two-phase energization timer T1 (step S185) is described in the flowchart, but it may be configured as a unique timer that gradually increases with the passage of time.

When the monitoring unnecessary condition is not satisfied in step S100, the CU 50 cancels the monitoring of the energization register 71 by the energization register monitoring unit 72 in step S210. In the following step S220, the first monitoring counter C1 is reset. After that, the ECU 50 ends the current loop and shifts to the next loop.

Figure 5:
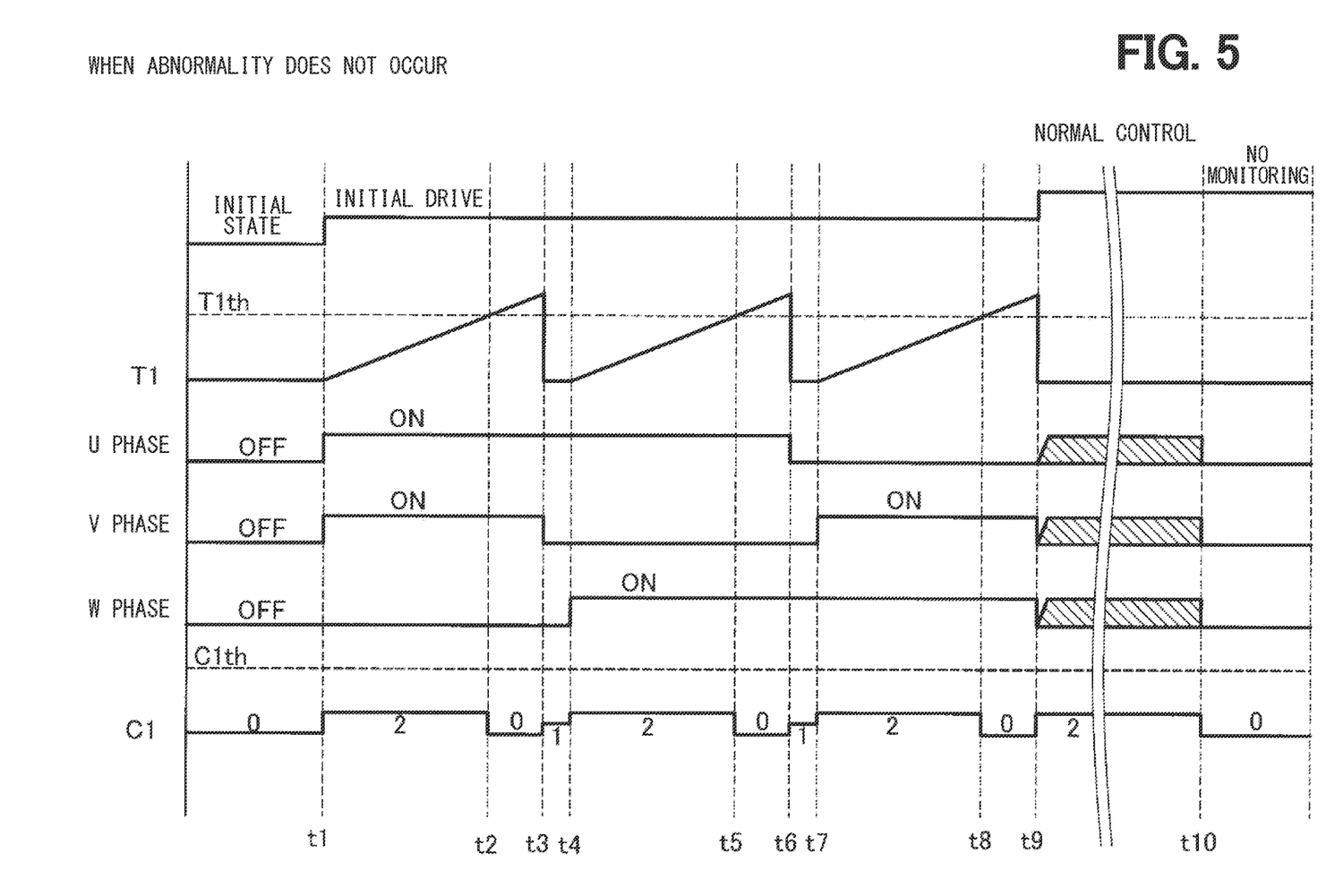
FIG. 5 is an example of a time chart when the operation of the motor is not abnormal.

FIG. 5 shows the value of each phase of the energization register 71, the value of the first monitoring counter C1, and the value of the two-phase energization timer T1 when no abnormality occurs. At time t1, the U phase and the V phase change from off to on (step S110 in FIG. 4, hereinafter, the process corresponding to which step in FIG. 4 is described in parentheses). Therefore, at time t1, the value of the first monitoring counter C1 changes from 0 to 2 (step S120). Further, the two-phase energization timer T1 gradually increases (step S185).

When the two-phase energization timer T1 reaches the second threshold value T1th at time t2 (step S150, Yes), the ECU 50 resets the value of the first monitoring counter C1 to 0 (step S160). At time t2, the U phase and V phase are continuously energized, so that the two-phase energization timer T1 is further gradually increased (step S185).

When the V-phase energization is turned off at time t3 (step S110), the value of the first monitoring counter C1 changes from 0 to 1 (step S120). Further, since the two-phase energization is stopped, the ECU 50 resets the two-phase energization timer T1 to 0 (step S145).

When the W phase energization is turned on at time t4 (step S110), the value of the first monitoring counter C1 changes from 1 to 2 (step S120). Further, since the two-phase energization starts (step S140, Yes), the two-phase energization timer T1 gradually increases (step S185).

When the two-phase energization timer T1 reaches the second threshold value T1th at time t5 (step S150, Yes), the ECU 50 resets the value of the first monitoring counter C1 to 0 (step S160). At time t2, the U phase and W phase are continuously energized, so that the two-phase energization timer T1 is further gradually increased (step S185). Hereinafter, from time t6 to t9, the energized phase and the non-energized phase are different, but the operation is the same as that from time t2 to t5, so the description thereof will be omitted.

When the shift operation is performed by the driver at time t10, the ECU 50 cancels the monitoring of the energization register 71 by the energization register monitoring unit 72 and resets the first monitoring counter C1 to 0 (steps S210 and S220).

As can be seen from FIG. 5, under normal conditions, the value of the first monitoring counter C1 does not exceed the first threshold value C1th.

Figure 6:
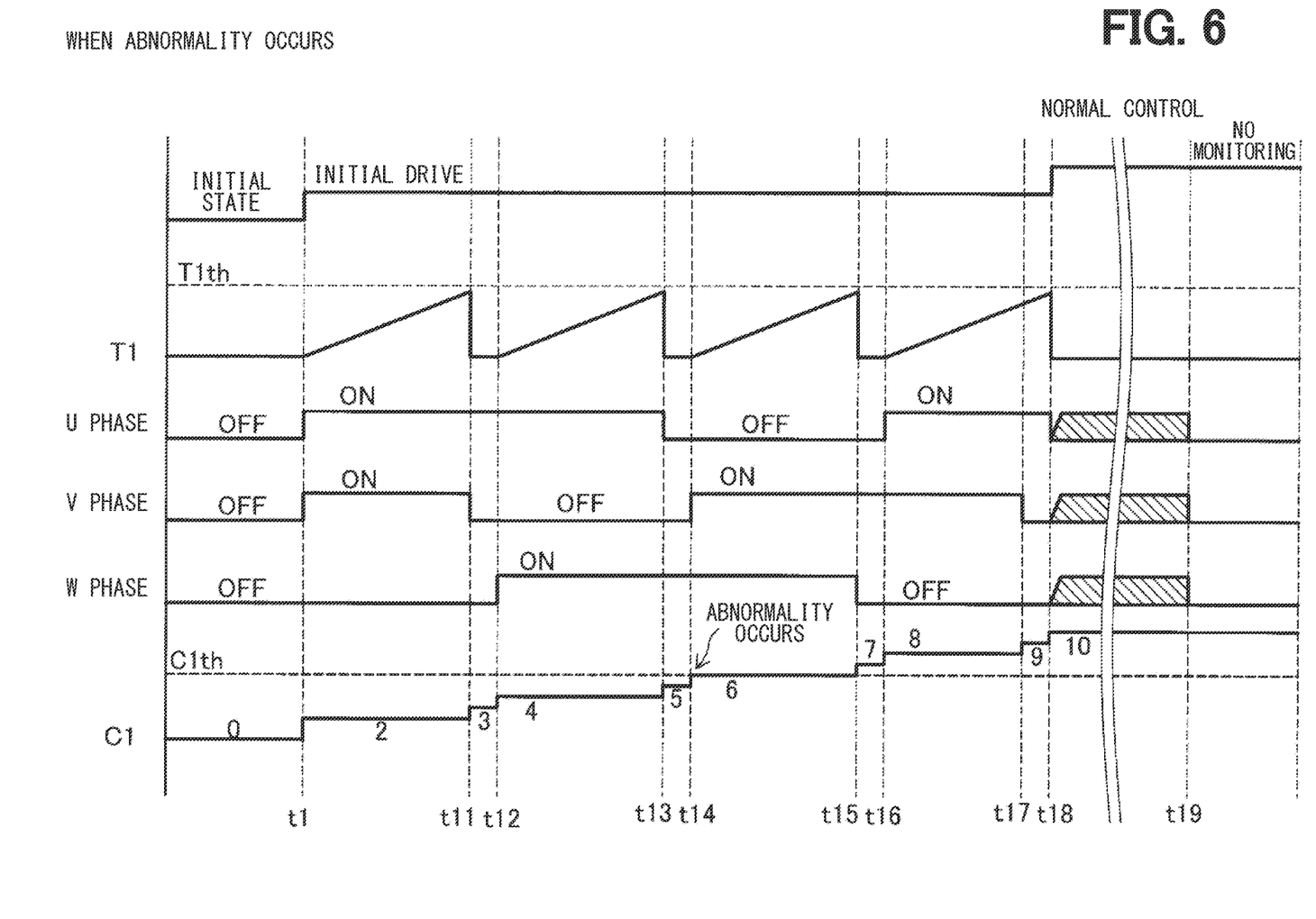
FIG. 6 is an example of a time chart when the operation of the motor is abnormal.

FIG. 6 shows the value of each phase of the energization register 71, the value of the first monitoring counter C1, and the value of the two-phase energization timer T1 when an abnormality occurs. At time t1, the U phase and the V phase change from off to on (step S110). Therefore, at time t1, the value of the first monitoring counter C1 changes from 0 to 2 (step S120). Further, the two-phase energization timer T1 gradually increases (step S185). Up to here, the procedure is the same as in FIG. 5.

When the V-phase energization is turned off at time t11 (step S110), the value of the first monitoring counter C1 changes from 2 to 3 (step S120). Further, at time t11, only the U phase is energized, so that the two-phase energization timer T1 is reset before reaching the second threshold value T1th (step S145). Since the reset of the first monitoring counter C1 (step S160) is not executed until the two-phase energization timer T1 reaches the second threshold value T1th (No in step S150), the value of the first monitoring counter C1 is not reset.

When the W-phase energization is turned on at time t12 (step S110), the value of the first monitoring counter C1 changes from 3 to 4 (step S120). Further, at time t12, the two-phase energization of the U phase and the W phase is performed (step S140, Yes), so that the two-phase energization timer T1 is gradually increased again (step S185).

When the U-phase energization is turned off at time t13 (step S110), the value of the first monitoring counter C1 changes from 4 to 5 (step S120). Further, at time t13, only the W phase is energized, so that the two-phase energization timer T1 is reset before reaching the second threshold value T1th (step S145). As at the time t11, the value of the first monitoring counter C1 is not reset.

When the V-phase energization is turned on at time t14 (step S110), the value of the first monitoring counter C1 changes from 5 to 6 (step S120). Further, at time t14, the two-phase energization of the V phase and the W phase is performed (step S140, Yes), so that the two-phase energization timer T1 is gradually increased again (step S185). Hereinafter, the same process is repeated.

When the first threshold value C1th is 6, the value of the first monitoring counter C1 becomes equal to or higher than the first threshold value C1th at time t14 (step S130, No). That is, as a result of energization by the motor driver 41, the ECU 50 determines that either a magnetic field that does not start the rotation of the rotor of the motor 10 or a holding magnetic field that stops the rotation generated in the rotor cannot be generated, that is, an abnormality occurs in the operation of the motor 10. Therefore, the ECU 50 proceeds to step S200 and turns off the motor relay 46. Note that FIG. 6 shows a state in which the motor relay 46 is not turned off and energization is continued even after the occurrence of an abnormality in order to show that the value of the first monitoring counter C1 is increasing.

As described above, according to the first embodiment, the ECU 50 determines whether or not the monitoring unnecessary condition is satisfied. When the ECU 50 determines that the monitoring unnecessary condition is not satisfied, the ECU 50 monitors whether the energization of the motor 10 is in a predetermined state as the abnormal state. When the ECU 50 determines that the monitoring unnecessary condition is satisfied, the ECU 50 does not perform monitoring. As a result, the configuration can determine whether or not the operation of the motor 10 is abnormal when the motor 10 is driven at an extremely low speed such as excitation phase learning.

According to the first embodiment, during the monitoring period that during which the monitoring unnecessary condition is not satisfied, the ECU 50 determines that the operation of the motor 10 is the normal state when the number of counts of the first monitoring counter C1 in a predetermined period is less than the first threshold value C1th. During the monitoring period, the ECU 50 determines that the operation of the motor 10 is in the abnormal state when the number of counts of the first monitoring counter C1 in the predetermined period is equal to or greater than the first threshold value C1th, and turns off the motor relay 46.

Second Embodiment

Figure 7:
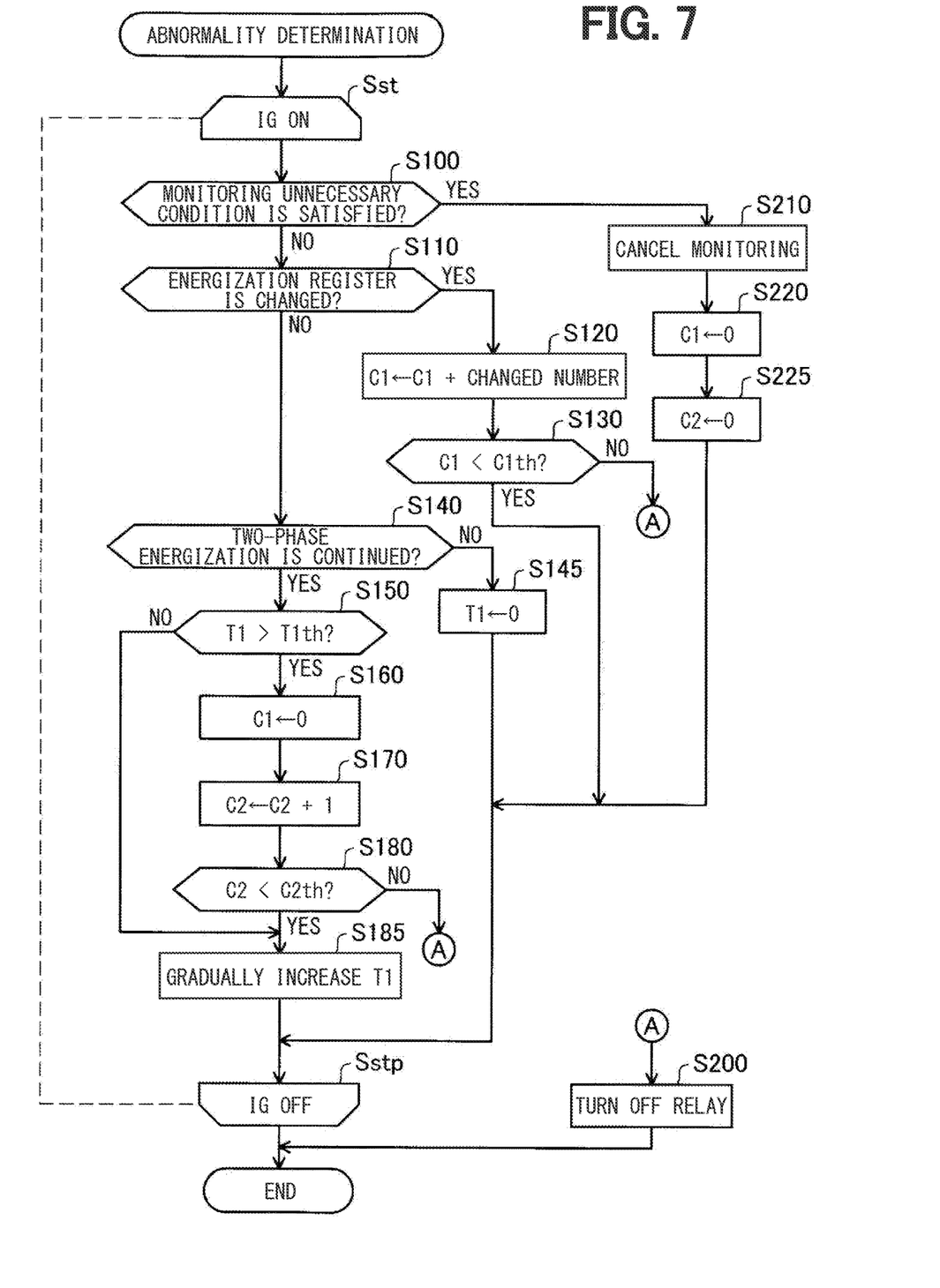
FIG. 7 is a flowchart showing an abnormal determination for an operation of a motor according to a second embodiment.

FIG. 7 describes an abnormality determination of the motor 10 performed by the ECU 50 in a second embodiment. The difference from FIG. 4 is that steps S170 and S180 are added after step S160, and S225 is added after step S220. Hereinafter, the points different from the flowchart of FIG. 4 will be described.

In step S170, which is executed after step S160, the ECU 50 counts up a second monitoring counter C2 when the first monitoring counter C1 is reset. The second monitoring counter C2 is a counter that counts the number of times that the first monitoring counter C1 is reset by the two-phase energization timer T1 reaching the determination second threshold value T1th.

In step S180 executed after step S170, the ECU 50 determines whether or not the value of the second monitoring counter C2 is less than a third threshold value C2th. When the value of the second monitoring counter C2 is less than the third threshold value C2th, the ECU 50 executes step S185, gradually increases the two-phase energization timer T1, terminates the current loop, and enters the next loop. On the other hand, when the value of the second monitoring counter C2 is equal to or higher than the third threshold value C2th, the ECU 50 shifts the process to step S200 and turns off the motor relay 46. As a result, the power supply to the motor 10 is stopped. The third threshold value C2th is determined by the holding time of the rotor in the motor 10. In step S225 executed after step S220, the ECU 50 resets the second monitoring counter C2.

Figure 8:
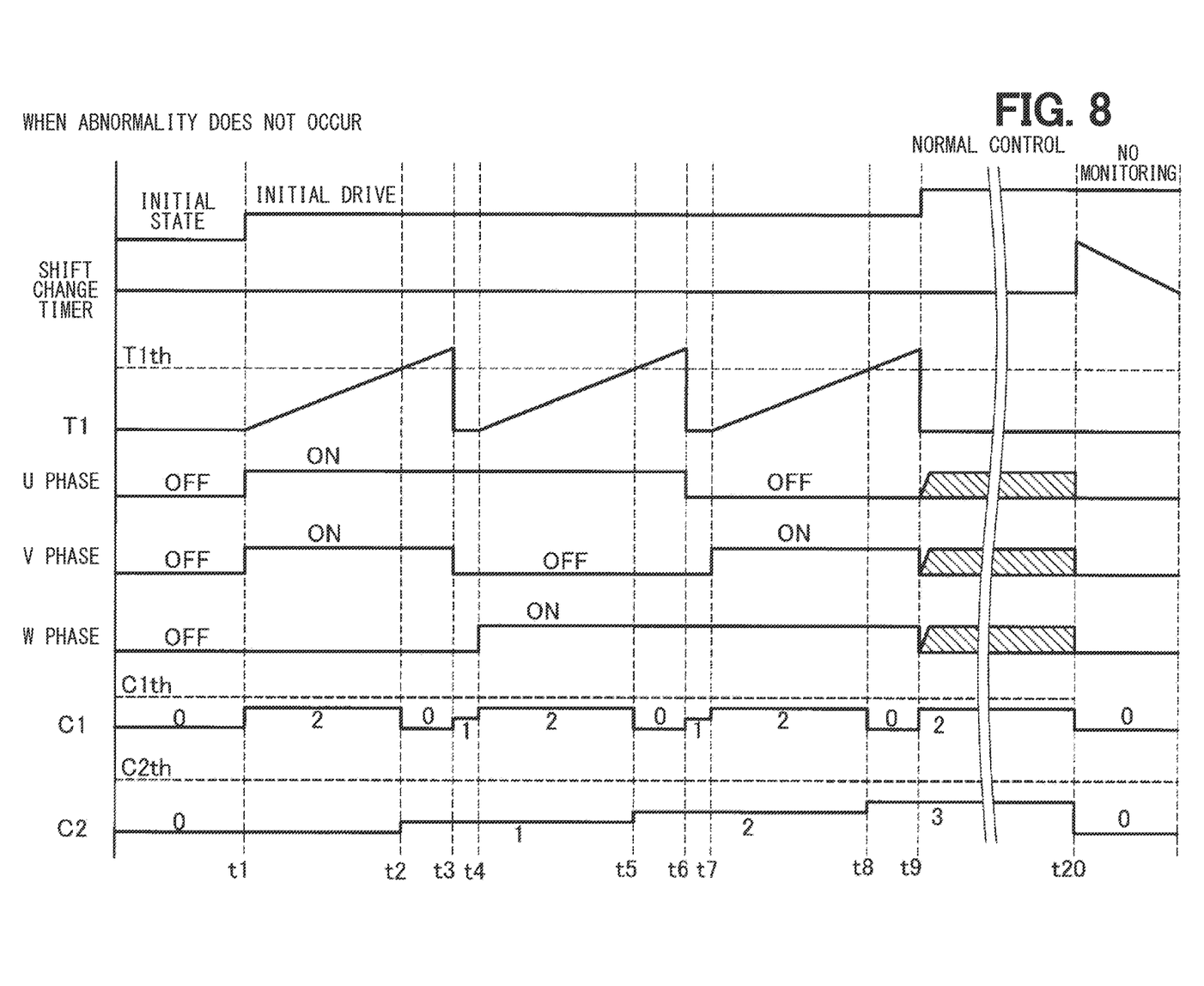
FIG. 8 is an example of a time chart when the operation of the motor is not abnormal.

FIG. 8 shows an example when no abnormality occurs. The difference from FIG. 5 is that the value of the second monitoring counter C2 and the shift change timer are shown. The shift change timer is a timer that is set to a predetermined value when a shift operation is performed, and then counts down with the passage of time. When the shift change timer is not zero, it is in a non-monitoring state. In FIG. 8, the first monitoring counter C1 is reset because the two-phase energization is changed to the one-phase energization at the times t2, t5, and t8. Therefore, the second monitoring counter C2 is counted up at the times t2, t5, and t8. By the time t9 when the monitoring period ends, the second monitoring counter C2 does not reach the third threshold value C2th. Therefore, the ECU 50 does not determine that the operation of the motor 10 is in an abnormal state.

When the shift operation by the driver is performed at time t20, the shift range change monitoring unit 73 (FIG. 2) may detect the shift operation by the driver, and the ECU 50 may reset the monitoring counter C2 (step S225) by resetting the first monitoring counter C1 (step S220). At this time, the ECU 50 may have a non-monitoring period in which the number of counts of the first monitoring counter C1 is not monitored for a certain period after the shift operation by the driver is performed.

Figure 9:
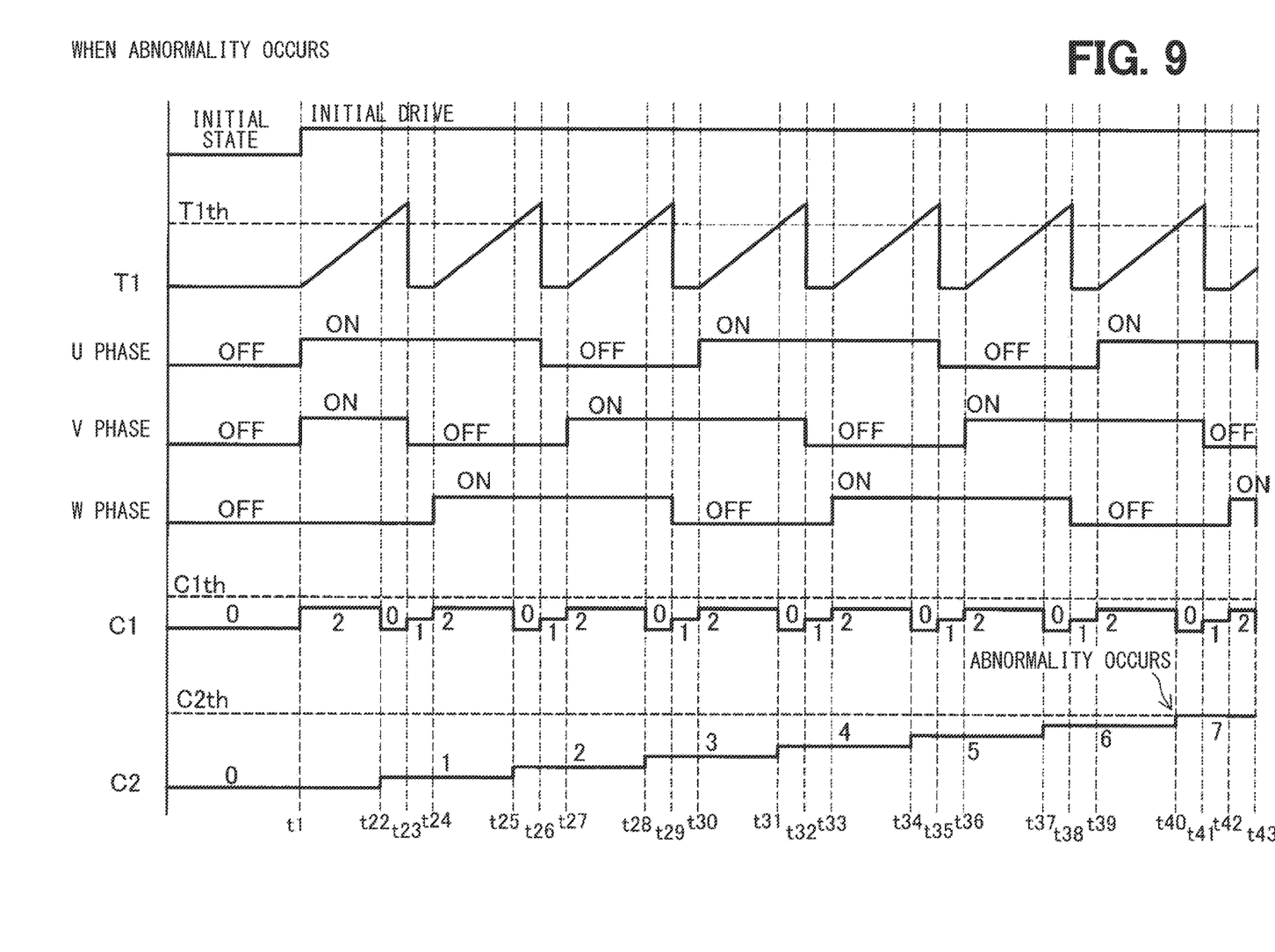
FIG. 9 is an example of a time chart when the operation of the motor is abnormal.

FIG. 9 shows an example in which the occurrence of an abnormality is detected by using the second monitoring counter C2. In this example, the two-phase energization timer T1 reaches the second threshold value T1th at the times t22, t25, t28, t31, t34, t37, and t40 during the two-phase energization, as shown in FIGS. 5 and 8. Therefore, the value of the first monitoring counter C1 is reset to 0. Therefore, the count value of the second monitoring counter C2 is counted up at the times t22, t25, t28, t31, t34, t37, and t40. In the example shown in FIG. 9, at time t40, the second monitoring counter C2 reaches the third threshold value C2th. Therefore, the ECU 50 determines that the operation of the motor 10 is in an abnormal state. The first monitoring counter C1 does not reach the first threshold value C1th. Note that FIG. 9 also shows a state in which the motor relay 46 is not turned off and energization is continued even after the occurrence of an abnormality in order to show that the value of the second monitoring counter C2 is increasing, similarly to FIG. 6.

As described above, as described with reference to FIGS. 8 and 9, the ECU 50 determines whether or not the operation of the motor 10 is abnormal by using the value of the second monitoring counter C2, and if the motor 10 is abnormal, the motor relay 46 can be turned off.

As described above, also in the second embodiment, the ECU 50 determines whether or not the monitoring unnecessary condition is satisfied. When the ECU 50 determines that the monitoring unnecessary condition is not satisfied, the ECU 50 monitors whether the energization of the motor 10 is in an abnormal state, which is predetermined. When the ECU 50 determines that the monitoring unnecessary condition is satisfied, the ECU 50 does not monitor the energization of the motor 10. As a result, the configuration can determine whether or not the operation of the motor 10 is abnormal when the motor 10 is driven at an extremely low speed such as excitation phase learning.

According to the second embodiment, the configuration can determine whether or not the operation of the motor 10 is abnormal even when the energization of the U phase, the V phase, and the W phase is switched before the two-phase energization timer T1 reaches the second threshold value T1th.

Further, according to the second embodiment, the shift range change monitoring unit 73 (FIG. 2) detects the shift operation by the driver, the ECU 50 resets the first monitoring counter C1 and the second monitoring counter C2, and the ECU 50 sets a certain period from a time point when the driver performs a shift operation as the non-monitoring period during which the number of counts of the first monitoring counter C1 is not monitored. Alternatively, the ECU 50 may perform the same processing in the first embodiment.

The present disclosure should not be limited to the embodiments described above, and various other embodiments may be implemented without departing from the scope of the present disclosure. For example, the technical features in the embodiments can be replaced or combined as appropriate. Also, if the technical features are not described as essential in the present specification, they can be deleted as appropriate.

What is claimed is:

1. A shift range device configured to switch a shift position, the shift range device comprising:
   a motor functioning as a power source for switching the shift position;
   an energizing unit configured to energize the motor;
   a monitoring unit configured to monitor an abnormal state in which a magnetic field that causes a rotation of a rotor of the motor not to start or a holding magnetic field that stops the rotation generated in the rotor is incapable to be acquired; and
   a first monitoring counter configured to count a number of times a phase in the motor is changed, wherein
   when the number counted by the first monitoring counter is less than a first threshold value in a predetermined period, the monitoring unit determines that an operation of the motor is in a normal state,
   when the number counted by the first monitoring counter is equal to or greater than the first threshold value in the predetermined period, the monitoring unit determines that the operation of the motor is in the abnormal state, and
   when the monitoring unit determines that the abnormal state occurs, the monitoring unit causes the energizing unit to stop energizing the motor.

2. The shift range device according to claim 1, further comprising
   a two-phase energization timer configured to count a time of two-phase energization when two or more phases are energized in the motor, and reset the time of two-phase energization when two or more phases are not energized, wherein
   when a count value of the two-phase energization timer becomes equal to or greater than a predetermined second threshold value, the monitoring unit resets a count value of the first monitoring counter.

3. The shift range device according to claim 2, wherein
   the monitoring unit includes a second monitoring counter configured to count a number of times the count value of the first monitoring counter is reset, and
   when a count value of the second monitoring counter becomes equal to or greater than a third threshold value, the monitoring unit determines that the operation of the motor is in the abnormal state.

4. The shift range device according to claim 3, wherein
   the monitoring unit resets the first monitoring counter and the second monitoring counter when a shift operation is performed by a driver.

5. The shift range device according to claim 2, wherein
   the predetermined second threshold value is defined by a holding time of the rotor in the motor.

6. The shift range device according to claim 1, further comprising
   a determination unit configured to determine whether or not a monitoring unnecessary condition for the motor is satisfied, wherein
   when the determination unit determines that the monitoring unnecessary condition is not satisfied, the monitoring unit monitors the operation of the motor is in a predetermined state as the abnormal state, and
   when the determination unit determines that the monitoring unnecessary condition is satisfied, the monitoring unit does not monitor the operation of the motor.

7. The shift range device according to claim 1, wherein
   the monitoring unit resets the first monitoring counter when a shift operation is performed by a driver.

8. The shift range device according to claim 7, wherein
   the monitoring unit does not monitor the number counted by the first monitoring counter for a certain period after the shift operation by the driver is performed, and then monitors the number counted by the first monitoring counter.

9. The shift range device according to claim 1, wherein
   the monitoring unit does not monitor the abnormal state when at least one of (a) a shift operation in which a notification of a driver is capable, (b) a brake-on state, and (c) a parking brake-on state capable of maintaining a vehicle holding force regardless of a driver intervention is satisfied.

10. A shift range device configured to switch a shift position, the shift range device comprising:
    a motor functioning as a power source for switching the shift position;
    a motor driver configured to energize the motor;
    a processor configured to monitor an abnormal state in which a magnetic field that causes a rotation of a rotor of the motor not to start or a holding magnetic field that stops the rotation generated in the rotor is incapable to be acquired; and
    a first monitoring counter configured to count a number of times a phase in the motor is changed, wherein
    when the number counted by the first monitoring counter is less than a first threshold value in a predetermined period, the processor determines that an operation of the motor is in a normal state,
    when the number counted by the first monitoring counter is equal to or greater than the first threshold value in the predetermined period, the processor determines that the operation of the motor is in the abnormal state, and
    when the processor determines that the abnormal state occurs, the processor causes the motor driver to stop energizing the motor.

* * * * *